(12) United States Patent
Zimmerman et al.

(10) Patent No.: US 9,953,192 B2
(45) Date of Patent: Apr. 24, 2018

(54) RFID TAG COMMUNICATION TRIGGERED BY SENSED ENERGY

(71) Applicant: INTERMEC IP CORP., Lynnwood, WA (US)

(72) Inventors: Timothy M. Zimmerman, Waxhaw, NC (US); Kelly Ungs, Marion, IA (US)

(73) Assignee: INTERMEC IP CORP., Lynnwood, WA (US)

( * ) Notice: Subject to any disclaimer, the term of this patent is extended or adjusted under 35 U.S.C. 154(b) by 0 days.

(21) Appl. No.: 15/092,180

(22) Filed: Apr. 6, 2016

(65) Prior Publication Data

US 2016/0217306 A1 Jul. 28, 2016

Related U.S. Application Data

(63) Continuation of application No. 12/410,345, filed on Mar. 24, 2009, now Pat. No. 9,139,756.

(60) Provisional application No. 61/038,854, filed on Mar. 24, 2008.

(51) Int. Cl.
| | |
|---|---|
| G06K 7/00 | (2006.01) |
| G06K 19/077 | (2006.01) |
| H04Q 9/00 | (2006.01) |
| G06K 7/10 | (2006.01) |
| G06K 19/07 | (2006.01) |
| H04B 7/155 | (2006.01) |
| G08C 17/02 | (2006.01) |

(52) U.S. Cl.
CPC ....... *G06K 7/0008* (2013.01); *G06K 7/10316* (2013.01); *G06K 7/10435* (2013.01); *G06K 19/0707* (2013.01); *G06K 19/0712* (2013.01); *G06K 19/0717* (2013.01); *G06K 19/07749* (2013.01); *G06K 19/07766* (2013.01); *G06K 19/07773* (2013.01); *H04Q 9/00* (2013.01); *G06K 19/0723* (2013.01); *G08C 17/02* (2013.01); *H04B 7/155* (2013.01); *H04L 2209/805* (2013.01); *H04Q 2209/47* (2013.01); *H04Q 2209/75* (2013.01); *H04Q 2209/823* (2013.01)

(58) Field of Classification Search
None
See application file for complete search history.

(56) References Cited

U.S. PATENT DOCUMENTS

| | | |
|---|---|---|
| 4,363,020 A | 12/1982 | Venema |
| 5,541,574 A | 7/1996 | Lowe et al. |
| 5,686,902 A | 11/1997 | Reis et al. |
| 5,825,302 A | 10/1998 | Stafford |
| 5,874,724 A * | 2/1999 | Cato ............... G06K 7/10079 235/382 |
| 5,874,896 A | 2/1999 | Lowe et al. |
| 6,198,381 B1 | 3/2001 | Turner et al. |
| 6,232,870 B1 | 5/2001 | Garber et al. |
| 6,252,508 B1 | 6/2001 | Vega et al. |
| 6,335,685 B1 * | 1/2002 | Schrott ............ G06K 7/10079 235/385 |
| 6,590,498 B2 | 7/2003 | Helms |

(Continued)

*Primary Examiner* — Mohamed Barakat
(74) *Attorney, Agent, or Firm* — Oliff PLC; R. Brian Drozd

(57) ABSTRACT

An RFID tag is equipped with an energy sensor for receiving an appropriate energy signal or registering an appropriate temperature/environmental level. The RFID tag only responds to a query from an RFID reader if the sensor receives the appropriate stimulation.

20 Claims, 3 Drawing Sheets

(56) References Cited

U.S. PATENT DOCUMENTS

| | | |
|---|---|---|
| 6,707,376 B1 | 3/2004 | Patterson et al. |
| 6,838,989 B1 | 1/2005 | Mays et al. |
| 6,839,035 B1 | 1/2005 | Addonisio et al. |
| 6,944,424 B2 | 9/2005 | Heinrich et al. |
| 6,952,560 B2 | 10/2005 | Feibig et al. |
| 7,403,120 B2 | 7/2008 | Duron et al. |
| 7,425,899 B2 * | 9/2008 | Stewart ............... G06K 19/0723 340/568.1 |
| 7,443,301 B2 | 10/2008 | Tucker et al. |
| 7,586,397 B2 * | 9/2009 | Bayley ............ G06K 19/07345 340/10.1 |
| 8,054,160 B2 | 11/2011 | Corrado et al. |
| 8,205,800 B2 | 6/2012 | Addy |
| 2002/0149484 A1 | 10/2002 | Carrender |
| 2004/0105411 A1 | 6/2004 | Boatwright et al. |
| 2006/0006987 A1 * | 1/2006 | Hashimoto .......... G06K 7/0008 340/10.51 |
| 2006/0114109 A1 | 6/2006 | Geissler |
| 2006/0208899 A1 | 9/2006 | Suzuki et al. |
| 2006/0220785 A1 | 10/2006 | Ferdman |
| 2006/0267736 A1 * | 11/2006 | Tiernay ............... G06K 19/0707 340/10.51 |
| 2007/0040683 A1 * | 2/2007 | Oliver ............ G06K 19/07345 340/572.1 |
| 2007/0210162 A1 | 9/2007 | Keen et al. |
| 2007/0222603 A1 | 9/2007 | Lai et al. |
| 2007/0285237 A1 | 12/2007 | Batra et al. |
| 2008/0012689 A1 | 1/2008 | Liu et al. |
| 2008/0111688 A1 | 5/2008 | Nikitin et al. |
| 2008/0297323 A1 | 12/2008 | Barkan |
| 2010/0156640 A1 | 6/2010 | Forster |

\* cited by examiner

RFID TAG COMMUNICATION TRIGGERED BY SENSED ENERGY

CROSS-REFERENCE TO RELATED APPLICATIONS

This is a Continuation of application Ser. No. 12/410,345 filed Mar. 24, 2009, which claims the benefit of U.S. Provisional Application No. 61/038,854 filed Mar. 24, 2008. The disclosure of the prior applications is hereby incorporated by reference herein in its entirety.

BACKGROUND

RFID readers are used to scan RFID tags on packages in environments such as warehouses and distribution centers where multiple RFID tags may be within range of a particular RFID reader. Typically, a group read may be made of an entire pallet of packages with RFID tags. If there is a discrepancy between the information scanned by an RFID reader and the expected responses, each package on the pallet must be isolated, for example separated by distance outside the range of the reader, or individually placed in a Faraday cage, and queried to determine if one or more tags are not responding.

When packages having RFID tags are read in a high speed conveyor belt tunnel, a specific tag's identification is used to make routing decisions for the package or to verify sequence processing. However, a tag may sometimes provide an unwanted response when triggered by random RF energy. The unwanted response may occur if a package with an RFID tag is placed too close to another package with an RFID tag on the conveyor belt, and the tags of both items sense the read and/or write command from the RFID reader energy within the tunnel. In addition, RFID tags are susceptible to responding to reads by unauthorized personnel.

There is a need for a system that overcomes the above problems, as well as providing additional benefits. Overall, the above examples of some related systems and associated limitations are intended to be illustrative and not exclusive. Other limitations of existing or prior systems will become apparent to those of skill in the art upon reading the following Detailed Description.

DETAILED DESCRIPTION

Described in detail below is an RFID reader that emits energy such as laser light, infrared light, any other wavelength of electromagnetic energy, sound or ultrasound energy, or other energy carrier modulated with a signal to trigger one or more targeted RFID tags to respond to an RFID interrogation. Alternatively, targeted RFID tags may be placed in a controlled environment having a temperature within a certain limited range before the tags are triggered to respond. Traditional RFID tags are equipped with a sensor to detect the energy emitted by the RFID reader and respond appropriately.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
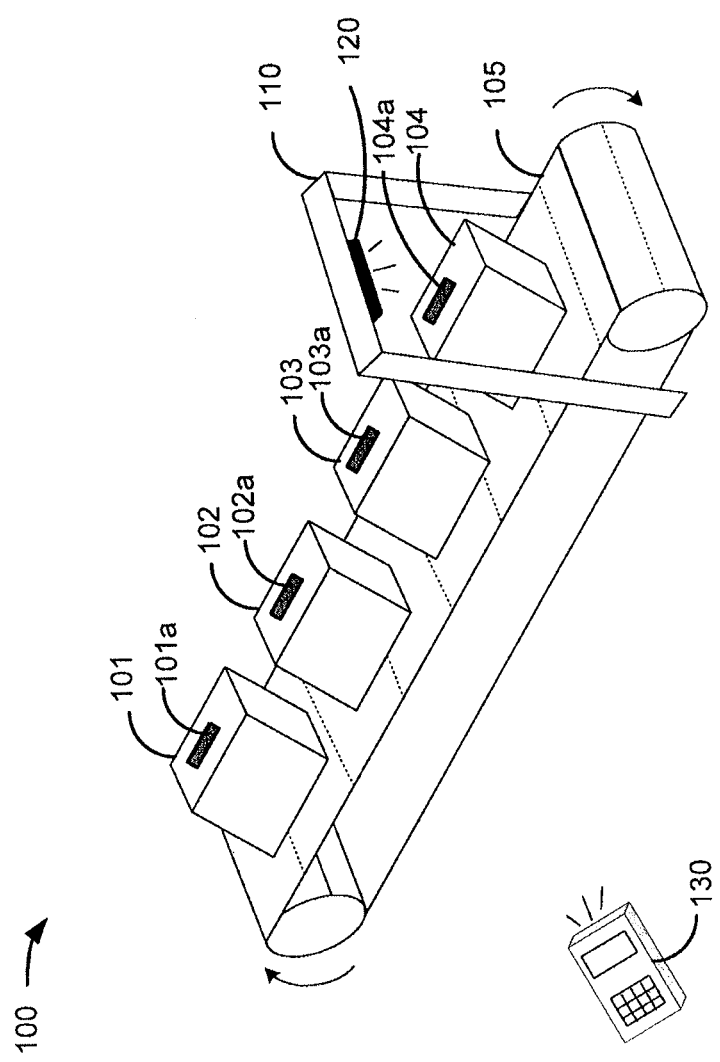
FIG. 1 shows a fixed RFID reader and a mobile handheld RFID reader in a typical RFID scanning environment.

FIG. 1 shows a typical application in which an RFID reader having an energy emitter would be used for unlocking targeted RFID tags. In an environment such as a warehouse, packages 101, 102, 103, 104, each having an RFID tag 101a, 102a, 103a, 104a, may move along a conveyor belt 105. As described in detail below, the packages 101, 102, 103, 104 each have an energy sensor associated with a respective tag 101a, 102a, 103a, 104a. Typically, a package's energy sensor would be located very close to the package's RFID tag. In a first example, a fixed RFID reader 120 attached to a structure 110 spanning across a conveyor belt 105 is used to scan RFID tags 101a, 102a, 103a, 104a. The RFID reader 120 may be attached to any structure on, next to, near, or over a location where RFID tagged packages pass, such as a conveyor belt, a loading dock door, or a forklift truck. In a second example, a mobile handheld RFID reader 130 may be used near the conveyor belt 105.

In either embodiment, the RFID reader 120, 130 may be constantly emitting energy aimed in a particular direction. For convenience of discussion, the specific example of a laser will be used for the energy emitter used with the RFID reader 120, 130, although other types of energy emitters may be used. Thus, a fixed RFID reader 120 hanging directly over a conveyor belt 105 would have its laser mounted to aim the beam downwards, while the packages 101, 102, 103, 104 would be oriented on the conveyor belt such that the RFID tags 101a, 102a, 103a, 104a and energy sensors would be located on the top face of the package. Alternatively, a mobile handheld RFID reader 130 to the side of the conveyor belt 105 would have its laser aimed sideways, while the packages 101, 102, 103, 104 would be oriented on the conveyor belt such that the RFID tags 101a, 102a, 103a, 104a and sensors would be located on a side face of the package facing the handheld RFID reader 130. The laser beam emitted by the RFID reader 120, 130, may be used as a key to trigger an RFID tag's response to an RFID interrogation. Thus, if a package's energy sensor does not first receive the RFID reader's 120, 130 emitted energy signal, the RFID tag will not respond to an RFID query, even though the RFID tag might be in range of the RFID reader's 120, 130 RF signal. The RFID reader 120, 130 may emit its laser beam either constantly or intermittently between scans of RFID tags to save power. Also, the emitted laser beam may be focused to select a single tag or may be diverging, yet still directional, such that one or more tags within the diverging beam are selected to be responsive.

Using an RFID reader 120, 130 in conjunction with an energy emitter such as a laser may serve several purposes. In one scenario, the laser beam may be used as a security mechanism. For example, items of high security such as expensive or confidential assets may require added security. An RFID tag's energy sensor may be configured to respond only to energy of a specific wavelength. Thus, only an RFID reader equipped with the appropriate wavelength laser will be able to access data stored within that RFID tag. Alternatively or additionally, the energy emitter can emit sound waves at a pre-set frequency or in a predetermined frequency and/or amplitude pattern to trigger a particular RFID tag to respond to RFID queries. Alternatively or additionally, the energy emitter may be a source of invisible energy, such as infrared, ultrasound, or invisible wavelength lasers, and the energy emitter may even be independent of the RFID reader. For example, an emitter may be mounted over an area where RFID tags are read, and the RFID reader may be positioned at a different location. The lack of visibility of the emitted energy and the placement of the energy emitter in a different location from the RFID reader add additional layers of security because even personnel working in the area or even working directly with the RFID reader would not be aware of the energy source used to trigger responses from certain packages with RFID tags or even the location of the energy emitter. Alternatively or additionally, the RFID tag may employ thresholding circuitry so that a received energy signal or RF signal having a minimal power trigger level would be necessary to trigger a response which would eliminate false triggering of the energy sensor/tag. Alternatively or additionally, the energy source may be encoded, encrypted, or secured, for example modulated with a prearranged pattern, such that a processor attached to an RFID tag's sensor would permit access to an RFID tag's data only if the proper encoded energy were received at the sensor. In one example, the RFID tag's antenna may be used as the energy sensor to receive a particular encoded RF signal from the RFID reader. Whether or not the RF signal transmitted by the RFID reader is encoded, the RFID tag response to the RF signal may or may not be encoded. Further, if the response is encoded, the tag need not use the same methodology to encode the response as the RFID reader used to encode the original RFID signal.

In another example, with the standardization of RFID tag read and write over-the-air protocols, many RFID tags will respond to any RFID reader that provides an RFID signal to the tag and a read command. Thus, with an energy source such as a laser or other energy emitter, an RFID interrogator may specifically identify a tag and its associated asset to respond to a query without receiving responses from all tags that may be present in the RFID field.

In yet another example, an RFID reader may illuminate an area such as a forklift pallet with an RF field, and expect all RFID tags within the pallet to respond to the RFID query. However, if there is a discrepancy between the expected response and the actual received responses, each RFID tag must typically be individually polled/scanned to determine which tag or tags are not responding. Instead of isolating and querying each individual package, a laser beam, or other energy source, emitted by the RFID reader or a separate source may be used to trigger a specific tag to respond. In this case, the tags may have more than one mode. The tag may be placed in a mode that does not require a laser trigger to respond to an RFID query, or the tag may be placed in a mode that requires receiving a laser trigger or registering a temperature level before responding to an RFID query. Possible methods of triggering different modes include, but are not limited to, using specific RF or laser codes corresponding to each mode and using a threshold power level to toggle between modes.

Alternatively or additionally, biometric sensors can be used to unlock an individual RFID tag to ensure security of the data stored in the memory of the tag. Non-limiting examples of biometric sensors that can be used with an RFID tag include sensors that responds to a thumb print or recognizes vein patterns or blood vessels corresponding to a particular individual's hand, finger, or retina.

Alternatively or additionally, movement sensors can be used to trigger an RFID tag to respond to an RFID query. For example, one or more accelerometers or other movement sensors can be coupled to an RFID tag such that if the object and corresponding tag is shaken or displaced in a predetermined series of gestures, the RFID tag will be unlocked. Clearly, this type of movement sensor would be suitable for non-breakable objects.

Figure 2:
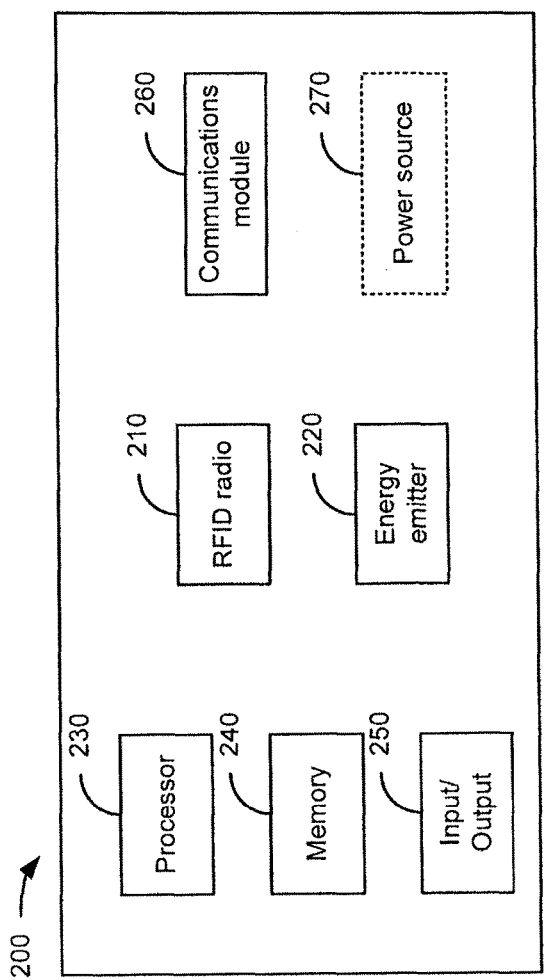
FIG. 2 shows a suitable block diagram of an RFID reader with an energy emitter.

FIG. 2 shows a block diagram of an RFID reader 200 used to read RFID tags. An RFID reader may include one or more processors 230, memory units 240, power sources 270, input/output devices 250, RFID radios 210, energy emitters 220, and communications modules 260.

A processor 230 may be used to run RFID reader applications and respond to energy sensor inputs. Memory units 240 may include but are not limited to, RAM, ROM, or any combination of volatile and non-volatile memory. For either the fixed RFID reader 120 or the mobile handheld RFID reader 130, a power supply 270 may include, but is not limited to, a battery or other portable power source such as a solar cell. In addition, the fixed RFID reader 120 may also derive its power through wired means, such as a power cord plugged into an electrical outlet. An input/output device 250 may include, but is not limited to, hardware or software triggers to start and stop the RFID reader or to initiate other RFID reader functions, triggers to stop or start generation of the energy emission-source, triggers to place the energy sensor in a particular mode, visual displays, speakers, and communication devices that operate through wired or wireless communications.

An RFID radio 210 includes standard components for communication with RFID tags at any radio frequency or frequencies, including an RF antenna. A communication module 260 may be used to receive and transmit communications. A mobile RFID reader 130 may communicate wirelessly, or may be plugged into a module with wired connections for communicating electrically or optically. A fixed RFID reader 120 may communicate either wirelessly or through electrical or optical cables.

Energy emitters 220 may emit energy such as laser light, infrared light, any wavelength or wavelengths of electromagnetic energy, and ultrasound. A person skilled in the art will understand that the emitted energy may be constant, pulsed in time, or sent encoded with a particular prearranged code. Alternatively, the energy emitters 220 may not emit any energy if the RFID tags are equipped with a temperature sensor, such that an RFID tag would only respond to an RFID query if the tag is placed in an environment having a temperature within a predetermined temperature range, for example between zero and ten degrees Celsius.

Figure 3:
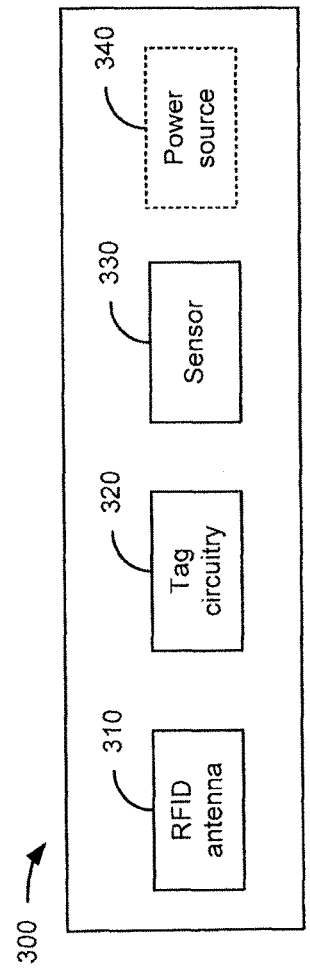
FIG. 3 shows a suitable block diagram of an RFID tag with an energy sensor.

FIG. 3 shows a block diagram of an RFID tag 300 able to respond to an RFID reader 200 with an energy emitter. An RFID tag may include one or more RFID antennas 310, tag circuitry 320, sensors 330, and power source 340. An RFID tag may be passive or active. With a passive tag, the RF signal transmitted by an RFID reader 120, 130 induces electrical current in the RFID antenna 310 to provide power to the tag circuitry 320 and/or the sensor 330; a separate power source 340 would not be required. Also, a signal may be emitted by the antenna 310 in response to the RF signal from the RFID reader 120, 130. With an active tag, the RFID antenna 310 responds to the RF signal from the RFID reader 120, 130 but does not necessarily provide power from induced currents because a power source 340, such as a battery, may be used.

Tag circuitry 320 serves several purposes that include, but is not limited to, memory functions, logic functions, and communication functions. The memory function may be performed by non-volatile memory such as EEPROM. The logic functions may process received RF signals from an RFID reader and/or received energy emissions, whether encoded or not. The communications functions may convert analog RF and energy signals to digital signals that the logic functions can operate upon.

The tag's energy sensor 330 may be semiconductor based, such as a photodiode, photoresistor, photocell, or charge coupled device, or an ultrasonic sensor such as a piezoelectric crystal. Filters (electrical, optical or otherwise) may be used with the energy sensor in order to prevent energy from sources other than the RFID reader 120,130 from triggering the tag's response.

In one embodiment, the RFID tag's energy sensor 330 may be powered in a similar manner as a passive tag's antenna. Upon receiving an RF signal from an RFID reader, electrical current is induced in the tag's antenna 310, and the current provides sufficient power to the tag's energy sensor 330 and tag circuitry 320 for transmitting a response. Alternatively, the RFID tag's energy sensor 330 and/or antenna 310 may receive power provided by a power source 340 such as a battery.

Alternatively, the RFID tag may have a temperature sensor to detect the local temperature. When the sensor detects the temperature to be within a certain predetermined temperature range, the tag circuitry 320 may be triggered to respond to an RFID reader query. Otherwise, the tag circuitry 320 will not respond to an RFID query. Thus, in this example, the triggering energy signal may be an environmental or passive energy signal. As such, the tag's energy sensor may detect a change in any environmental energy level, including pressure, light, color, etc. Thus, an automated system may employ the reader 200, which monitors when ambient temperature satisfies a threshold condition (e.g. drops below a threshold temperature), at which point it attempts to read an RFID tag that becomes selectively responsive to read/write functions when the temperature drops below the threshold temperature.

Alternatively, the RFID tag may have sensors 330 and electronic circuitry for detecting movement or biometric input. When the appropriate predetermined movement or series of movements have been sensed or when a correct biometric input has been received, the tag circuitry 320 is unlocked and permitted to respond to an RFID query.

Alternatively or additionally, while the tag's energy sensor is shown as a separate element, it may form part of the tag circuitry 320. For example, as described herein, a triggering signal may be an RF signal at an energy level above a predetermined threshold (and above a standard energy level for typical RF communications for reading from and writing to the tag). Thus, when an energy sensing portion of the tag circuitry 320 in this example receives an RF signal above the threshold, then read/write operations with the tag may be enabled.

Figure 4:
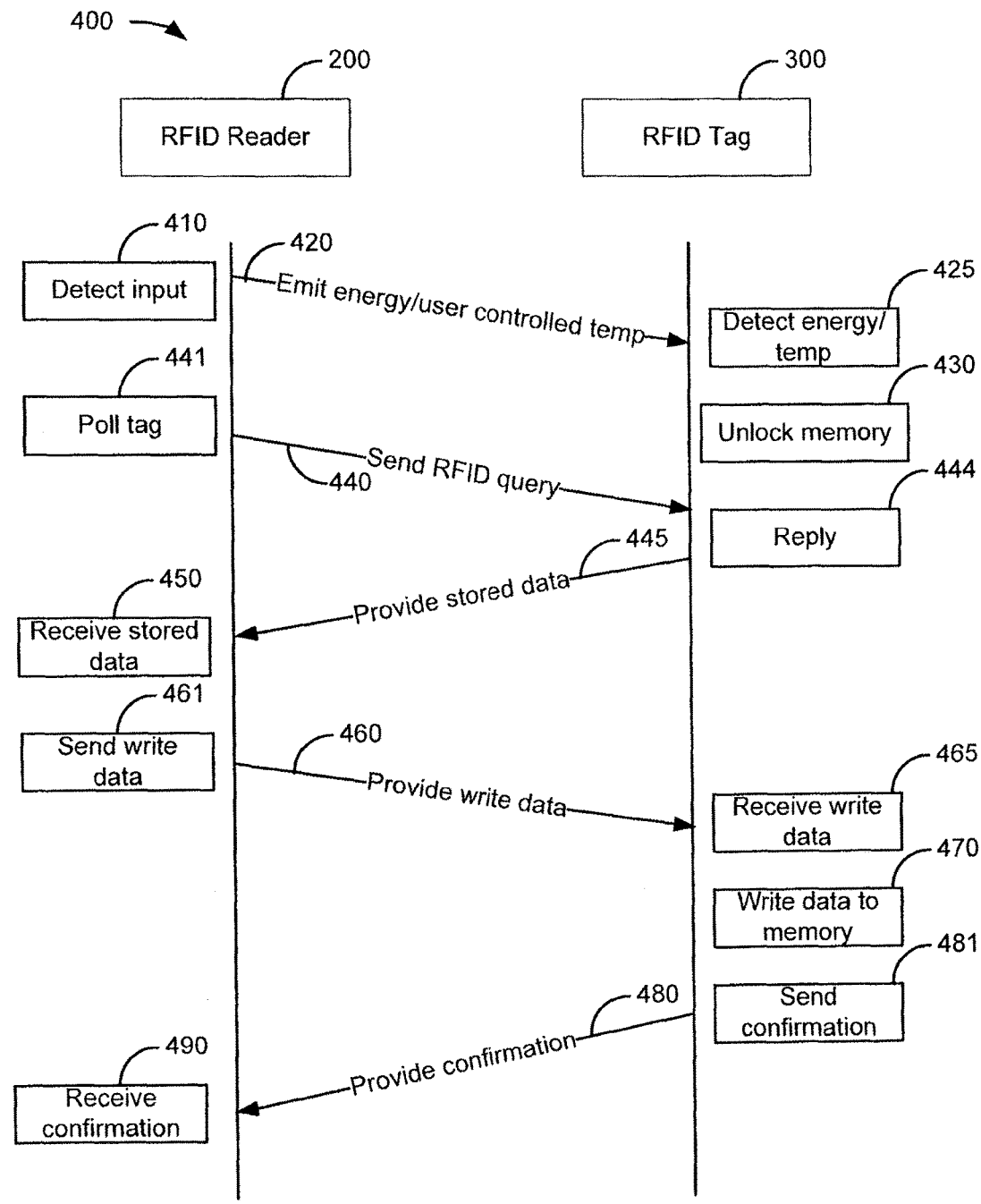
FIG. 4 is a flow chart illustrating an example of a series of communications between an RFID reader with an energy emitter and an RFID tag with and energy sensor.

FIG. 4 illustrates an example communication process 400 between RFID reader 200 and RFID tag 300 that uses energy emission to trigger a response from the RFID tag. The actions of the RFID reader 200 on the left and the RFID tag 300 on the right are shown relative to each other as a function of time, with time increasing in the downwards direction in FIG. 4. Transmissions from the RFID reader to the RFID tag or vice versa are shown by the arrows crossing the center of FIG. 4. At block 410, the RFID reader detects an input to begin querying RFID tags. At transmission 420, the RFID reader emits energy, whether electromagnetic or ultrasound, encoded or unencoded. Alternatively, the RFID tags may be placed in a controlled temperature environment within a preselected temperature range. The RFID tag either detects and processes the emitted energy or detects that the local temperature is within a predetermined temperature range at block 425. At block 430, upon verification that the appropriate energy signal was received or that the temperature is within a predetermined range, the RFID tag unlocks or otherwise makes available the data stored in its memory. The tag may be programmed to unlock access to stored data only for a limited period of time as an added security measure.

At block 441, the RFID reader polls the tag by sending an RFID query 440. At block 444, the RFID tag responds and provides the requested data stored in memory in transmission 445. At block 450, the RFID reader receives the stored data.

Optionally, at block 461, the RFID reader may send additional data to the RFID tag 460 to write to the tag's memory. At block 465, the RFID tag receives the data to be written and writes the data to memory at block 470. At block 481, the RFID tag may optionally transmit a confirmation 480 to the RFID reader that the data has been written to memory. At block 490, the RFID reader receives the confirmation sent by the RFID tag. Shortly after the time it takes to complete the communication process 400, the RFID tag may require its energy sensor to receive another energy signal before allowing data to be either read or written.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while an RFID reader for interrogating RFID tags with RF signals is mentioned, any frequency of electromagnetic signal may be used under the principles disclosed herein.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A RFID reader comprising:
a sensor to monitor an ambient temperature;
a transmitter configured to transmit an interrogation signal only when the ambient temperature corresponds to a predefined threshold condition; and
wherein the RFID tag only sends a response to the interrogation signal when a temperature level detected by a temperature sensor at the RFID tag corresponds to the predefined threshold condition.

2. The RFID reader of claim 1, wherein the RFID reader only sends the interrogation signal when an environment comprising one of the RFID reader and the RFID tag has an ambient temperature level below the predefined threshold condition.

3. The RFID reader of claim 1, wherein the RFID reader further comprising:
a processor configured to transmit data to write to a memory in the RFID tag.

4. The RFID reader of claim 1, wherein a source external to the RFID reader is configured to change the ambient temperature level.

5. The RFID reader of claim 4, wherein the RFID reader prompts the source to change the ambient temperature level.

6. The RFID tag of claim 5, wherein the source is selected from a group consisting of: a thermal generator, infrared generator, or an electromagnetic energy generator.

7. The RFID reader of claim 6, wherein the RFID tag does not respond at all to a RF query of the RFID reader while the RFID tag is within an environment having the temperature level outside of a predetermined temperature range.

8. The RFID reader of claim 7, wherein the RFID tag is programmed to unlock access to stored data only for a limited period of time so that during this limited period of time, the RFID tag will respond to the RF query while the RFID tag is within the environment having the temperature level within the predetermined temperature range.

9. The RFID reader of claim 7, wherein the RFID tag is configured to be set into a non-secure mode which enables to RFID tag to respond to the RF query regardless of whether the RFID tag is within the environment having the temperature level within the predetermined temperature range.

10. The RFID reader of claim 9, wherein the RFID tag is configured to change the non-secure mode to secure mode to enable to RFID tag to respond to the RF query only when the RFID tag is within the environment having the temperature level within the predetermined temperature range.

11. The RFID reader of claim 7, wherein the RFID tag is configured to be set into a secure mode which enables to RFID tag to respond to the RF query only when RFID tag is within the environment having the temperature level within the predetermined temperature range.

12. The RFID reader of claim 6, wherein the predefined threshold condition is a condition where the temperature falls below a predetermined threshold temperature.

13. A system comprising:
a RFID reader comprising:
a sensor to monitor an ambient temperature; and
a transmitter configured to transmit an interrogation signal only when the ambient temperature corresponds to a predefined threshold condition,
a RFID tag comprising:
an antenna configured to receive the interrogation signal from the RFID reader;
a memory for storing tag data;
a temperature sensor to detect a temperature level at the RFID tag and determine if the temperature level detected by the temperature sensor corresponds to the predefined threshold condition;
circuitry coupled to the RFID reader that is configured to one of read data from the memory of the RFID tag and transmit data to write to the memory of the RFID tag only if the ambient temperature corresponds to the predefined threshold condition.

14. The system of claim 13, wherein the antenna is further configured to receive data from the RFID reader, and wherein the circuitry is further configured to write the data to the memory only in response to the temperature level detected by the temperature sensor being determined to be at the predefined threshold condition.

15. The system of claim 13, wherein the circuitry transmits a response via the antenna or allow writing to the memory only during a time window after determining that the temperature level detected by the temperature sensor is at the predefined threshold.

16. A system comprising:
a RFID reader comprising:
a sensor to monitor an ambient temperature; and
a transmitter configured to transmit an interrogation signal only when the ambient temperature corresponds to a predefined threshold condition,
a RFID tag comprising:
an antenna configured to receive an RF signal from the RFID reader; and
a circuitry in communication with the antenna and configured to:
toggle the RFID tag to operate between a first mode and a second mode upon receiving a mode-switching signal, wherein the mode-switching signal comprises an encoded RF signal having one of a first RF code corresponding to the first mode or a second RF code corresponding to the second mode;
operate in the first mode when receiving the mode-switching signal containing the first RF code, wherein in the first mode, the circuitry processes the RF signal from the RFID reader and transmits a first response via the antenna prior to experiencing a predetermined condition;
operate in the second mode when receiving the mode-switching signal containing the second RF code such that the RFID tag only responds to an RFID reader interrogation signal in the second mode after the first response to the first mode, wherein in the second mode, the circuitry processes the RF signal and transmits a second response via the antenna only after experiencing the predetermined condition.

17. The system of claim 16, wherein the RFID tag further comprising a sensor configured to receive an energy signal, wherein the energy signal is selected from a group consisting of: laser light, infrared light, one or more wavelengths of electromagnetic energy, sound energy, ultrasound energy, movement, and biometric input, and further wherein the appropriate signal is a first pre-determined energy signal, and the mode-switching signal is a second pre-determined energy signal.

18. The system of claim 16, wherein the predefined threshold condition is a condition where the ambient temperature falls below a predetermined threshold temperature.

19. A method comprising:
monitoring a change in an ambient temperature existing in an environment;
comparing the ambient temperature against a predefined threshold condition, wherein when the ambient temperature corresponds to the predefined threshold condition,
transmitting an interrogation signal from an RFID reader to an RFID tag, and
receiving a response to the interrogation signal, from the RFID tag, when a temperature level detected by a temperature sensor at the RFID tag corresponds to the predefined threshold condition.

20. The method of claim 19, wherein the transmitting of the interrogation signal from the RFID reader after monitoring the change in ambient temperature is independent of the RFID tag corresponding to the predefined threshold condition.

* * * * *